Oct. 27, 1964    W. FÄRBER    3,154,359
CONNECTOR
Filed Oct. 22, 1962    2 Sheets-Sheet 1

INVENTOR
Wilhelm Färber
BY *Spencer & Kaye*
ATTORNEYS

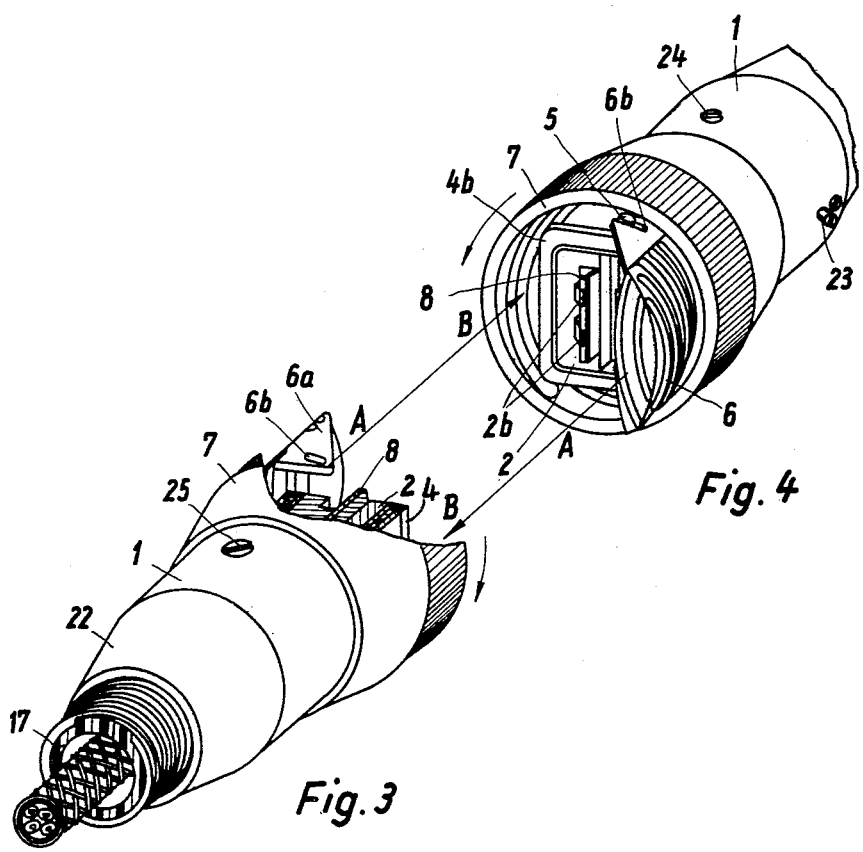

3,154,359
CONNECTOR
Wilhelm Färber, Grossaspach, Germany, assignor to
Telefunken Patentverwertungs - G.m.b.H., Ulm
(Danube), Germany
Filed Oct. 22, 1962, Ser. No. 232,130
Claims priority, application Germany Nov. 10, 1961
11 Claims. (Cl. 339—39)

The present invention relates to an electric connector for use in communication equipment, particularly for a portable carrier-frequency cable surrounded by plastic sheathing, which cable can be used in the field for rapidly establishing temporary communication lines. Connectors of this type have to be rugged enough to withstand various types of mechanical stresses, and must, in both coupled and uncoupled state, be waterproof and unaffected by deposits of foreign particles. Moreover, the two connectors forming a complete electrical junction should be identical, thereby not only reducing manufacturing costs but also making it unnecessary to provide connector elements of different types. Yet another requirement for connectors suitable for field use is that they will not inadvertently become disconnected from each other.

There exist many different types of plug-type connectors which have tried to achieve these results, but which have been found not to meet all of the above requirements. For example, in order to obtain the desired watertightness in disconnected condition, it has been proposed to provide a special cover which can be screwed on to the connector, or a dummy plug which can be inserted into the connector. The cover or dummy plug is generally attached to the connector proper by means of a short chain. It will be appreciated that such loosely hanging parts will not only produce undesired noise, but that they can easily be ripped off and lost. Alternatively, the cover can be hingedly connected to the outside of the connector, but such covers are not fixedly secured to the connector proper. Moreover, the cover must mate with the particular connector to which it is attached, i.e., a male-type connector member must be provided with a female-type cover member, and vice versa.

It is, therefore, a primary object of the present invention to provide a connector which overcomes the above drawbacks, and, with this object in view, the present invention resides mainly in an electric connector suitable for establishing a connection with another and similarly constructed connector, which connector comprises a connector sleeve, a coupling sleeve mounted on the connector sleeve and having an internal thread, and a cover mounted on the connector sleeve. The cover has a side wall and two end walls, the side wall carrying first thread means and the end walls carrying second thread means, each of the thread means being of the same pitch as the internal thread of the coupling sleeve. The cover is movable between first and second positions, as follows: the first position is a position wherein the side wall extends parallel to the axis of the sleeves and projects out of the coupling sleeve so that the first thread means is exposed and free to engage the internal thread of the coupling sleeve of another and similarly constructed connector, the internal thread of the first-mentioned coupling sleeve itself being able to engage the first thread means of the cover of such other connector when the cover thereof itself is in a similar first position. The second position is a position wherein the cover is generally transverse to the axis of the sleeves and wherein the second thread means is engaged by the internal thread of the coupling sleeve. In this way, the cover, while occupying its second position, serves as a closure member for closing off the connector when the same is not connected to another connector.

Additional objects and advantages of the present invention will become apparent upon consideration of the following description when taken in conjunction with the accompanying drawings in which:

FIGURES 3 and 4 are aligned perspective views showing two connectors according to the present invention, each having its respective cover in the above-described first position so that the exposed thread means on the side wall of each respective cover will engage the internal thread of the coupling sleeve of the other connector.

Figure 1:
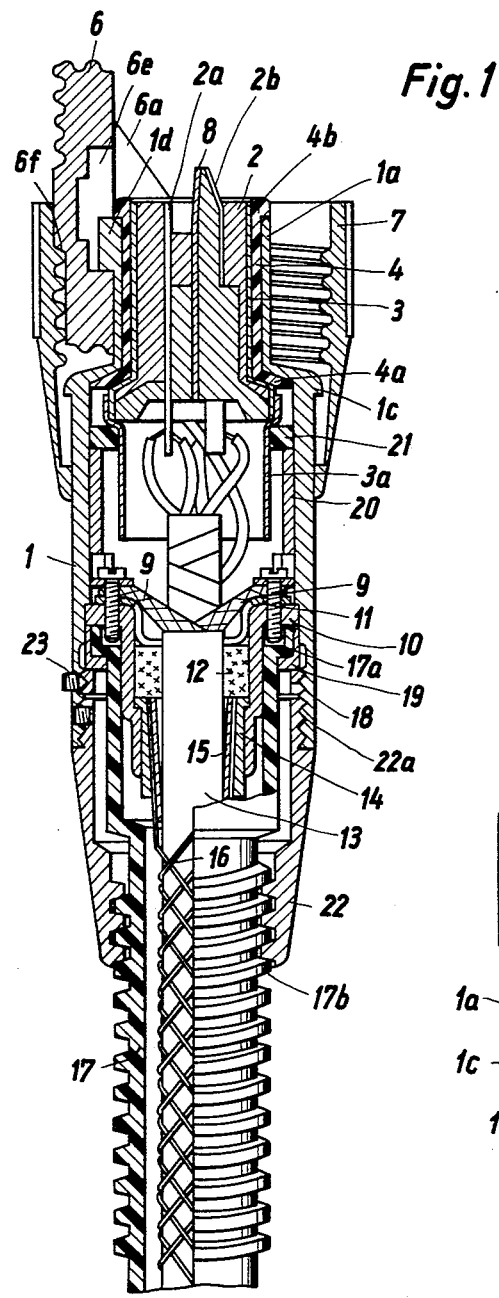
FIGURE 1 is a sectional view of a connector according to the present invention, the cover being shown as occupying its above-described first position, so that the connector is ready to be coupled to another and similarly constructed connector.

Referring now to the drawings, the same show a connector arrangement for a four-lead carrier-frequency cable surrounded by plastic sheathing, the leads being arranged in pairs with each pair of leads being shielded from the other pair. The entire cable is surrounded by a protective sheath made of wire netting.

The outer connector sleeve 1 is, for the most part, cylindrical, and tapers at its upper end into a sleeve portion 1a of rectangular cross section. Arranged within the sleeve portion 1a is an elastically seated contact socket 2, surrounded by a shielding sleeve made of two parts 3, 3a, and a sealing sleeve 4 made of rubber or elastic plastic. The sealing sleeve 4 seals the shielding sleeve 3, 3a, with respect to the connector sleeve 1 and also insulates these parts from each other. The sealing sleeve 4 has an internal flange portion 4a by means of which the sleeve 4 is mounted, there also being an external sealing bead 4b. As will be explained below, the latter is pressed against the front face of the sleeve 1 irrespective of whether or not the connector is connected to another connector.

Figure 2:
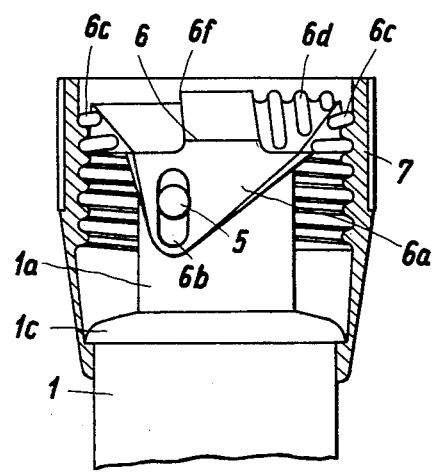
FIGURE 2 is a fragmentary sectional view similar to FIGURE 1 but showing the cover in its second position, i.e., the position the cover will occupy when the connector is not joined to another connector so that it is desired to close off the otherwise exposed opening.

As best shown in FIGURE 2, the sleeve 4 carries at each of its narrow sides a lug 5, which passes through an appropriately positioned bore in the sleeve portion 1a and serves to mount a closure member or cover 6. The latter is provided with two lateral flaps 6a each of which has an elongated slot 6b, so that the cover 6 is mounted for sliding movement as well as for pivotal movement about the lug 5. The cover 6 is provided with a thread 6c on each of two opposite end faces as well as a thread 6d on the outer surface of a side wall. These threads are of the same pitch and diameter as, and therefore able to mate with, the internal thread of a coupling sleeve 7. The threads are preferably threads of semicircular cross section.

The cover 6 has two functions:

When the connector is not joined to another connector, the cover will occupy the position shown in FIGURE 2, in which the threads 6c are in engagement with the threads of the coupling sleeve 7, the cover thus serving as a watertight closure for the connector. It will be understood that as the sleeve 7 is turned in the proper direction, it forces the cover tightly against the bead 4b of the sealing ring 4, thereby also forcing the sleeve 4 against the annular shoulder 1c of the connector sleeve 1.

When the connector is joined to another and similarly constructed connector, the covers 6 of the two connectors will each be placed into a position wherein the side wall is parallel to the axis of the connector, as shown in FIGURE 1, and the two connectors will then be placed opposite each other, in axial alignment, as shown in FIG- URES 3 and 4. Upon movement of the two connectors toward each other in the direction indicated by the arrows A—B, each cover 6 will be received in a sort of pocket formed by the opposite connector, so that the thread 6d of each cover 6 will threadedly engage the internal thread of the sleeve 7 of the other connector. The two connectors may then be threaded together. The covers 6 now serve as connecting elements.

Each cover 6 has an undercut recess 6e, as a result of which there is formed a shoulder which engages a radial projection 1d of the sleeve 1 of the same connector. It will be the inter-engagement between the shoulder of the cover 6 and the projection 1d which establishes the force-transmitting connection between the parts 1 and 6, so that the lugs 5 will not be called upon to withstand any appreciable forces. The force with which the two connectors are pressing together is transmitted from this projection 1d via the cover 6 to the coupling sleeve 7 of the other connector, this sleeve 7 abutting against a shoulder 6f on the outside of the cover 6 pertaining to the same connector.

The connector is equipped with an electric socket having two elastic movable contact plates 2a and two stationary contact plates 2b, the socket being pressed into an elastic mass so as to obtain both fluid-tightness and elasticity of the contacts. The connector socket is also provided with a flat shielding plate 8 arranged between each two contact pairs, the outer end of plate 8 extending outwardly so as to make contact with the plate 8 of the other connector. The inner end of the plate is widened so as to be in contact with the shielding sleeve 3, 3a. In this way, the two internal shields for the cable are connected to each other.

The outer steel wire braiding of the cable is divided into two ends 9 and is screwed to a mounting sleeve 10 arranged within the sleeve 1, thereby establishing electrical contact with the outer connector sleeve 1 and thus producing additional shielding. The screw connection also presses, via a yoke 11, a sealing ring 12 which is thus forced between the mounting sleeve 10 and cable sheath 13 so as to establish a hermetic seal. At the same time, a cable grip 16 is wedged between two conical wedging sleeves 14, 15, this cable grip 16 taking up the mechanical tensile stress of the cable and transmitting the same to the mounting sleeve 10.

A tubular sheath 17, made of rubber or elastic plastic, is provided for protecting the cable against bending, the upper flange 17a of the sheath 17 being connected to the mounting sleeve 10 by means of a shaped sleeve 19 which is pressed against the flange 17a by an annular nut 18. In this way, the mounting sleeve 10, as well as the sealing sleeve 4 through the intermediary of a spacer tube 20 and an insulating sleeve 21, are fixedly secured to the sleeve 1. It will be appreciated, therefore, that all of the interior components are fastened by means of a single nut.

The protective sheath 17 is provided externally with a trapezoidal thread 17b which mates with a corresponding thread of a connecting nut 22. The upper end of the nut 22 is connected with the sleeve 1 by means of a thread 22a which has a pitch smaller than that of thread 17b. As a result of this difference in pitch, the sheath 17 will, upon being connected to the connector by the nut 22, be stretched somewhat, so that thread 17b will be pressed firmly into the interspaces of the thread of nut 22 within which it is received, thereby producing a good seal.

The coupling sleeve 7 is prevented from sliding off the upper end of the connector sleeve 1 by the outwardly extending flange portion 1c, and from sliding off the lower end by a screw 23, which has the additional function of securing the annular nut 18 and of indicating the position of the connector when the same is used in the dark.

Also shown is a closure screw 24 which closes off an opening through which a filler mass can be poured into the interior of the connector. Another screw 25 closes off a further opening, arranged diametrically opposite the opening closed by the screw 24, which further opening allows the air to escape from the interior of the connector during the introduction of the filler.

The connector according to the present invention has the advantageous feature that the non-electrical parts, i.e., the parts which do not serve to establish electrical contact or to provide shielding, can be made of plastic, thereby facilitating mass production.

As is apparent from the drawings, an electric junction made up of two joined connectors according to the present invention will have a generally streamlined configuration and also have a flush outer surface, thereby allowing a cable incorporating such connections to be laid from a vehicle or from an aircraft without danger of getting the connection caught in trees, bushes, boulders, or other natural obstacles.

It will be understood that the above description of the present invention is susceptible to various modifications, changes, and adaptations, and the same are intended to be comprehended within the meaning and range of equivalents of the appended claims.

What is claimed is:

1. An electric connector suitable for establishing a connection with another and similarly constructed connector, said connector comprising, in combination:
   (a) a connector sleeve;
   (b) a coupling sleeve mounted on said connector sleeve and having an internal thread; and
   (c) a cover mounted on said connector sleeve and having a side wall and two end walls, said side wall carrying first thread means and said end walls carrying second thread means, each of said thread means being of the same pitch as said internal thread of said coupling sleeve, said cover being movable between first and second positions,
      (1) said first position being a position wherein said side wall extends parallel to the axis of said sleeves and projects out of said coupling sleeve so that said first thread means is exposed and free to engage the internal thread of the coupling sleeve of another and similarly constructed connector, the internal thread of said first-mentioned coupling sleeve itself being able to engage the first thread means of the cover of such other connector when the cover thereof itself is in a similar first position,
      (2) said second position being a position wherein said cover is generally transverse to the axis of said sleeves and wherein said second thread means is engaged by said internal thread of said coupling sleeve, said cover, in its second position, serving as a closure member for closing off the connector when the same is not connected to another connector.

2. A connector as defined in claim 1, further comprising electrical connector means arranged within said connector sleeve.

3. A connector as defined in claim 2, further comprising a sealing sleeve interposed between said connector sleeve and said connector means, said sealing sleeve having an external bead engaging a front end face of said connector sleeve.

4. A connector as defined in claim 2 wherein said cover has two lateral flap portions each having a longitudinal slot extending generally transverse to said side wall, and wherein said connector further comprises two stationary lugs passing through said slots, respectively, thereby mounting said cover for longitudinal and pivotal movement with respect to said lugs.

5. A connector as defined in claim 4 wherein said cover is provided with a recess forming a shoulder and said connector sleeve is provided with a projection, said shoulder and said projection interengaging each other when said cover is in its first position so as to establish a force-transmission to relieve said lugs of strain.

6. A connector as defined in claim 5 wherein said cover is provided with an additional shoulder engaging said coupling sleeve, whereby said cover, in its first position, serves as a force-transmitting element interposed between said connector sleeve and said coupling sleeve.

7. A connector as defined in claim 1, further comprising multiple-contact electrical socket means arranged within said connector sleeve; a sealing sleeve interposed between said connector sleeve and said connector means; a shielding sleeve interposed between said socket means and said connector sleeve and being insulated from the latter by said sealing sleeve, said shielding sleeve being connectable with the shielding of a cable to which the connector is joined.

8. A connector as defined in claim 7, further comprising a flat shielding plate interposed between at least two of the contacts of said socket means, an interior end of said shielding plate being connected with said shielding sleeve and an outer end of said plate having an exposed area adapted to make contact with the outer end of a similar plate of a similar connector.

9. A connector as defined in claim 1, further comprising a tubular sheath threadedly connected with a nut, said nut, in turn, being threadedly connected with said connector sleeve, the thread connecting said nut with said connector sleeve being of a smaller pitch than the thread connecting said nut with said sheath, whereby, upon tightening of said nut, said sheath is stretched.

10. A connector as defined in claim 1, further comprising electrical socket means and electrical shielding means, those components of the connector which serve for purposes other than effecting electrical contact and electrical shielding being made of plastic.

11. A connector as defined in claim 1 wherein the connector has such an external configuration that a junction established by two such connectors has a streamlined shape.

No references cited.